(12) United States Patent
Kula et al.

(10) Patent No.: US 8,577,555 B2
(45) Date of Patent: Nov. 5, 2013

(54) DUAL-CHAMBER IMPACT DETECTOR

(75) Inventors: Paul Kevin Kula, Farmington Hills, MI (US); Abraham Philip, Rochester Hills, MI (US); Steven Yellin Schondorf, Dearborn, MI (US); David James Tippy, Ann Arbor, MI (US); Bill Pappas, Oxford, MI (US); Yeruva Reddy, Farmington, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/590,713

(22) Filed: Aug. 21, 2012

(65) Prior Publication Data

US 2013/0079995 A1  Mar. 28, 2013

Related U.S. Application Data

(60) Provisional application No. 61/538,197, filed on Sep. 23, 2011.

(51) Int. Cl.
*B60R 21/013* (2006.01)

(52) U.S. Cl.
USPC .......................................................... 701/45

(58) Field of Classification Search
USPC ............................................................ 701/45
See application file for complete search history.

(56) References Cited

U.S. PATENT DOCUMENTS

| | | | |
|---|---|---|---|
| 3,602,607 A * | 8/1971 | Hodges | 417/148 |
| 6,212,456 B1 | 4/2001 | Stride | |
| 6,499,353 B1 * | 12/2002 | Douglas et al. | 73/722 |
| 6,607,212 B1 * | 8/2003 | Reimer et al. | 280/735 |
| 7,207,410 B2 * | 4/2007 | Song et al. | 180/274 |
| 7,331,415 B2 * | 2/2008 | Hawes et al. | 180/274 |
| 7,359,782 B2 * | 4/2008 | Breed | 701/45 |
| 7,525,416 B2 | 4/2009 | Mader | |
| 7,782,180 B2 | 8/2010 | Takafuji | |
| 2005/0269805 A1 * | 12/2005 | Kalliske et al. | 280/730.1 |
| 2007/0057490 A1 * | 3/2007 | Deflorimonte | 280/730.1 |
| 2009/0306857 A1 * | 12/2009 | Katz et al. | 701/45 |
| 2011/0015861 A1 * | 1/2011 | Burkatovsky | 701/301 |
| 2012/0139715 A1 * | 6/2012 | Yamazato | 340/436 |
| 2013/0127190 A1 * | 5/2013 | Shamoto | 293/117 |

* cited by examiner

*Primary Examiner* — Thomas Tarcza
*Assistant Examiner* — Alex C Dunn
(74) *Attorney, Agent, or Firm* — Frank A. MacKenzie; Brooks Kushman P.C.

(57) ABSTRACT

An impact detection system has two chambers disposed adjacent to one another. The two chambers have opposing tapered shapes, so that an impact anywhere along them will create a different pressure wave or pulse in each chamber. A pressure sensor module incorporating two pressure sensors is disposed at one end of the dual-channel unit, and comparison of the signals from the sensors can be used to discriminate both the location and severity of a pedestrian impact.

21 Claims, 7 Drawing Sheets

DUAL-CHAMBER IMPACT DETECTOR

CROSS-REFERENCE TO RELATED APPLICATIONS

This application claims the benefit of U.S. Provisional Application No. 61/538,197, filed Sep. 23, 2011, the disclosure of which is incorporated in its entirety by reference herein.

TECHNICAL FIELD

The present invention relates to an apparatus and method for detecting an impact, and more specifically to such an apparatus and method adapted to detect an impact between a pedestrian or other light-weight object and a motor vehicle.

BACKGROUND

Systems have been proposed to reduce the severity of injuries suffered by pedestrians when struck by a moving motor vehicle. Some such systems are referred to as "active," meaning that some action, response, or change is made to a portion or system of the vehicle in response to (or in anticipation of) striking the pedestrian. Examples of such active systems include bumper- or hood-mounted airbags and hood-lifting systems. Such active systems generally require some type of sensor or detection system to determine that a pedestrian impact has occurred or is about to occur.

A pedestrian impact detector should detect an impact occurring at any lateral location across the front end of the vehicle. It may also be advantageous to detect the lateral (left/right) location on the vehicle at which the pedestrian impact takes place.

U.S. Pat. No. 7,782,180B2 teaches a collision detection device installed in a bumper of an automotive vehicle that includes two deformable members each with a pressure sensor contained therein. The deformable members are arranged across the front end of the bumper so that each one covers approximately one-half of the width of the vehicle.

SUMMARY

An impact detection system is disclosed having two chambers disposed adjacent to one another. The two chambers have opposing tapered shapes, so that an impact anywhere along them will create a different pressure wave or pulse in each chamber. A pressure sensor module incorporating two pressure sensors is disposed at one end of the dual-channel unit, and comparison of the signals from the sensors can be used to discriminate both the location and severity of a pedestrian impact.

The disclosed dual-chamber design allows both of the pressure sensors to be located adjacent one another at one end of the IDU. This simplifies the packaging and manufacture of the impact detection system as compared with having two sensors located at separate locations.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
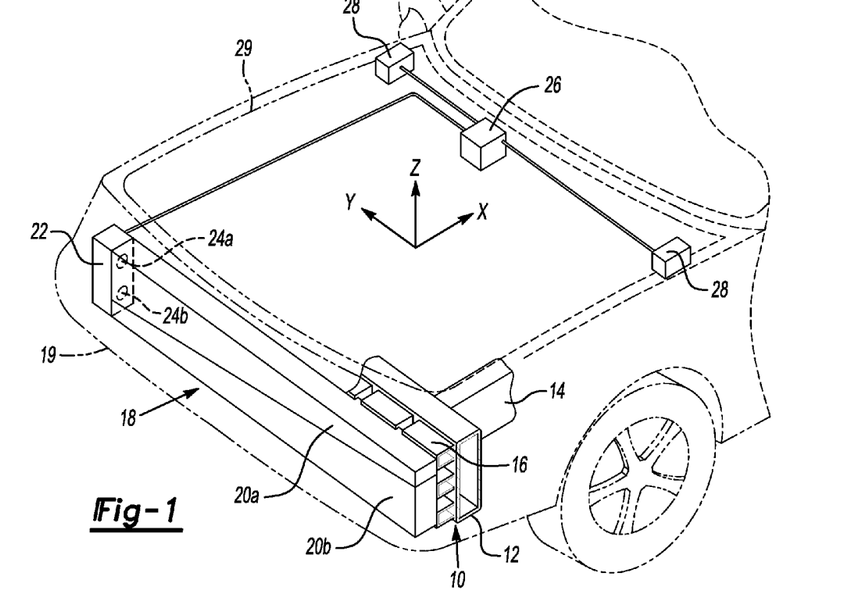
FIG. 1 is a simplified schematic view of the forward portion of a motor vehicle including a pedestrian impact detection system according to an embodiment of the invention.

Referring to FIG. 1, a motor vehicle has a front bumper system 10 generally comprising a transverse bumper beam 12 supported by vehicle frame components 14, an energy-absorbing component (EAC) 16 mounted adjacent to the front surface of bumper beam 12, and an impact detection unit (IDU) 18 disposed in front of the EAC. Bumper system 10 may be covered or enclosed by a relatively thin front fascia 19 to provide an attractive and/or aerodynamically efficient exterior surface of the front portion of the vehicle.

EAC 16 may, for example, be a plastic component and may be in the form of a repeating "hat-section" adapted to deform, crush, or flatten in order to absorb kinetic energy when bumper system 11 experiences a frontal impact. EAC 16 may incorporate a transverse channel or other feature(s) for mounting IDU 18.

IDU 18 comprises first and second substantially hollow, tubular chambers 20a, 20b mounted to the vehicle in an over/under arrangement. IDU 18 preferably extends across the full width of bumper beam 12 and may, if desired, be somewhat curved to integrate with the shape of bumper beam 12 and/or other forward structure of the vehicle. IDU 18 may also be curved or angled to extend around the left and right front corners of the vehicle.

The respective cross-sectional areas of chambers 20a, 20b (cross-sections taken in the y-z plane as shown in FIG. 1) vary along the length of IDU 18 (across the width of the vehicle front end), and do so in manner inverse to one another. That is, the cross-sectional area of upper chamber 20a increases from left to right (with reference to the vehicle body), while the cross-sectional area of lower chamber 20b decreases from left to right. Therefore, the ratio of the cross-sectional area of upper chamber 20a to that of lower chamber 20b varies constantly from a minimum value at the front left corner of the vehicle to a maximum value at the right corner.

Figure 2:
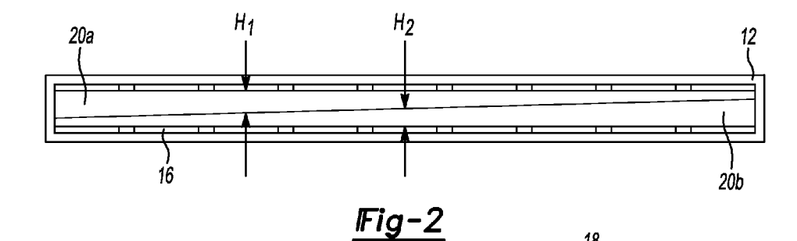
FIG. 2 is a schematic front view of the impact detection unit and bumper shown in FIG. 1.
Figure 3:
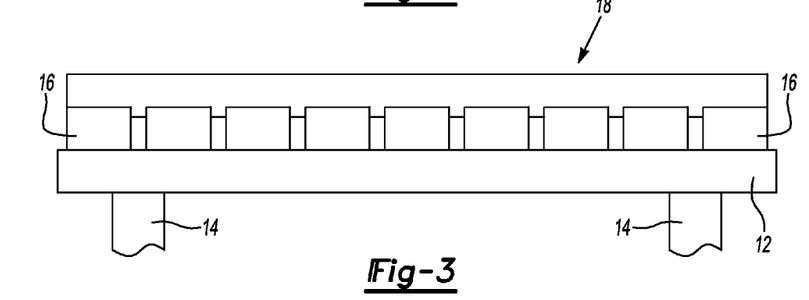
FIG. 3 is a schematic top view of the impact detection unit and bumper shown in FIG. 1.

In the embodiment of the IDU 18 shown in FIGS. 1-3, chambers 20a, 20b are substantially rectangular in cross-section and the lengthwise variations in the cross-sectional areas are achieved by the respective vertical dimensions (indicated as $H_1$ and $H_2$ in FIG. 2) varying along the length of IDU 18. That is, upper chamber 20a has a maximum height adjacent the right end of bumper system 10 and tapers to a minimum height adjacent its right end. Conversely, lower chamber 20b has a minimum height adjacent its right end and tapers to a maximum height adjacent its left end. The lengthwise variation in chamber heights $H_1$, $H_2$ may be uniform or non-uniform. Assuming that the two chambers are of approximately constant depth (measured parallel to the longitudinal or y-axis of the vehicle) along the length of IDU 18, it is apparent that the ratio of the cross-sectional area of upper chamber 20a to that of lower chamber 20b varies from a maximum value at the right end of bumper system 10 to a minimum value at the left end.

IDU 18 further comprises a sensor module 22 located at one end thereof. Sensor module 22 comprises two pressure sensors 24a, 24b such that the two sensors are in communication with the hollow interiors of chambers 20a, 20b respectively. Pressure sensors 24a, 24b are thus able to detect pressure internal to the two chambers substantially independently of one another. Chambers 20a, 20b may contain air or any other gas or mixture of gasses appropriate to allow pressure sensors 24a, 24b to make accurate readings.

Pressure sensors 24a, 24b may be any appropriate type of pressure transducer that generates an electrical signal representative of the sensed pressure at all times the vehicle is in operation. The signals generated by sensors 24a, 24b are preferably transmitted to an electronic control unit (ECU) 26 where they may be digitized, integrated, measured, compared, or otherwise electronically and/or mathematically processed as necessary to detect characteristics such as the magnitude, the time, and the location of an impact on IDU 18. It is also possible to use the raw signals from sensors 24a, 24b to actuate a pedestrian protection countermeasure, without significant signal processing by an ECU.

Packaging the two pressure sensors 24a, 24b adjacent one another in a single module 22 contributes to the efficiency of the design of the overall sensor system, as compared with locating multiple sensors at separate, spaced-apart locations. Fabrication, installation, and servicing of IDU 18 are improved by the unitary nature of sensor module 22.

ECU 26 is electronically connected with other components of the vehicle's pedestrian protection system. For example, FIG. 1 schematically indicates a pedestrian protection countermeasure including actuators 28 that raise at least a portion of the vehicle hood 29 above its normal position. This lifting creates more separation between the underside of hood 29 and rigid vehicle components (not shown) beneath the hood, as is well known in the pedestrian protection art. Such added separation allows the hood to bend or deflect downward under the pressure of a pedestrian strike. The sensor signals, when properly analyzed and/or processed by ECU 26, may be used to trigger actuators 28 in order to lift the hood at an appropriate time. This is but one of many possible uses of the signals from the sensors.

The dimensions and location of IDU 18 relative to the vehicle are preferably selected so that if the vehicle strikes a pedestrian, the pedestrian's leg or legs are expected to impact the front surfaces of both upper and lower chambers 20a, 20b at approximately the same time. Because the cross-sectional areas of chambers 20a, 20b vary along the length of IDU 18, such an impact will cause two separate and distinct pressure changes within the chambers as measured by the upper and lower sensors 24a, 24b. Various properties of the signals generated by sensors 24a, 24b may be studied to gain information indicating the magnitude and lateral location of an impact on the front of the vehicle. Such information may be used to adjust the thresholds and/or other parameters used in algorithms that control deployment of pedestrian protection countermeasures.

Chambers 20a, 20b are shown in direct contact with one another, but they may be spaced from one another by some distance. Chambers 20a, 20b need only be disposed closely enough adjacent to one another that an impact will create a measurable pressure change in both chambers.

Figure 4:
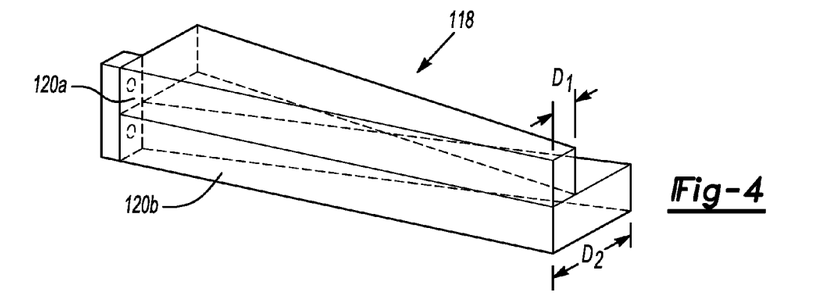
FIG. 4 is a schematic view of an alternative embodiment of an impact detection unit.

FIG. 4 schematically depicts another exemplary embodiment of an IDU 118. Upper and lower chambers 120a, 120b have vertical dimensions that are constant along the length of the IDU but have respective depth dimensions (indicated as $D_1$ and $D_2$ in FIG. 4) which vary or taper along the length of the IDU, thereby achieving the lengthwise variation in cross-sectional area. The upper and lower chambers may have any cross-sectional shape (circular, oval, polygonal, etc.) to allow efficient integration into the vehicle front end structure. Both chambers need not necessarily have the same shape.

Figure 5:
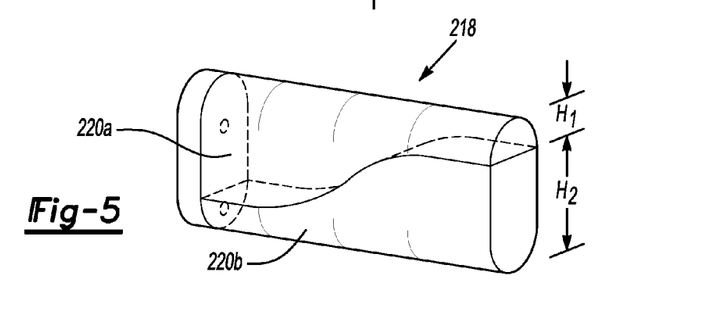
FIG. 5 is a schematic view of another alternative embodiment of an impact detection unit.

FIG. 5 schematically depicts another exemplary embodiment of an IDU 218 in which the respective vertical dimensions $H_1$ and $H_2$ of upper and lower chambers 220a, 220b vary non-linearly along the length of the IDU. Also in this embodiment, the upper and lower portions of IDU 218 are rounded, so that upper and lower chambers 220a, 220b are non-rectangular in cross-section.

Figure 6:
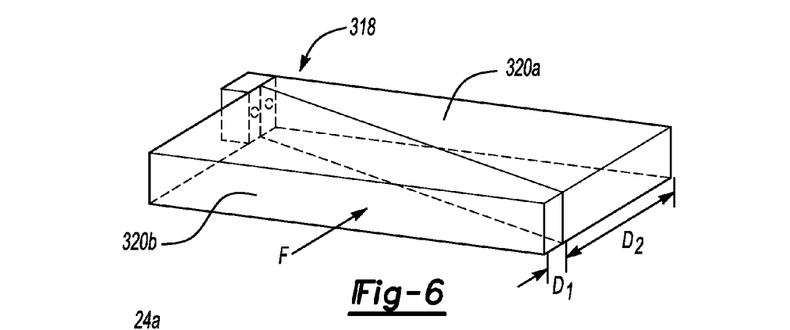
FIG. 6 is a schematic view of another alternative embodiment of an impact detection unit.

FIG. 6 schematically depicts another exemplary embodiment of an IDU 318 in which chambers 320a, 320b are disposed horizontally relative to one another, rather than in an over/under arrangement. Respective depth dimensions $D_1$ and $D_2$ vary or taper along the length of IDU 318. An impact force F directed against the forward chamber 320a creates a measurable pressure change in the rear chamber 320b as well.

Figure 7:
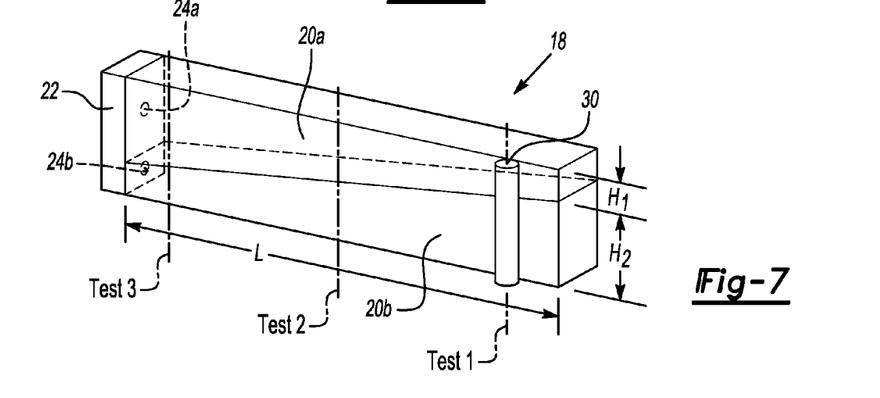
FIG. 7 is a schematic view showing the setup used during a series of test runs of the system disclosed herein.

FIG. 7 shows, in schematic form, the geometry of a test set-up in which a striker rod 30 was used to strike IDU 18 to simulate pedestrian impacts at three different locations across the length of the IDU. Pressure readings from sensors 24a, 24b were recorded during three impact tests: Test 1 is an impact at a point offset toward the end of IDU 18 most distant from the sensor module 22. Test 2 is an impact at the approximate center of IDU 18. Test 3 is an impact at a point offset toward the end of IDU 18 closest to sensor module 22. The data graphs of FIGS. 5-11 show possible ways the pressure signals may be analyzed to determine the nature of an impact.

Figure 8A:
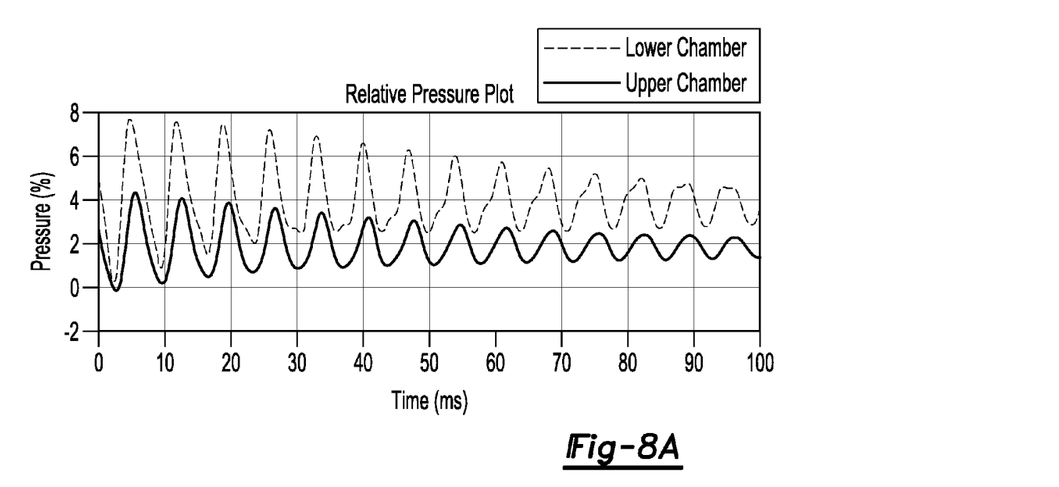
FIGS. 8 through 14 are plots of data gathered during test runs of the system shown in FIG. 6.
Figure 8B:
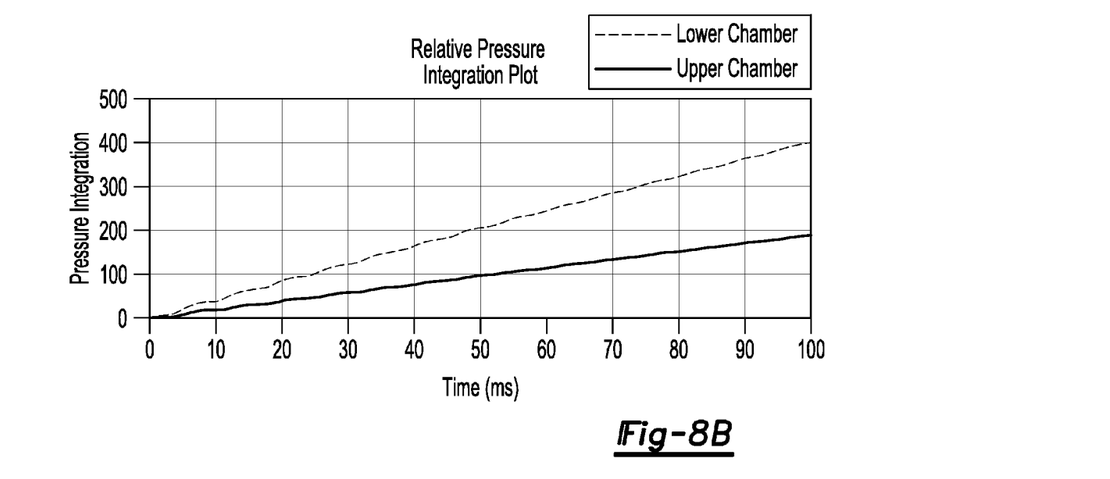
Figure 9A:
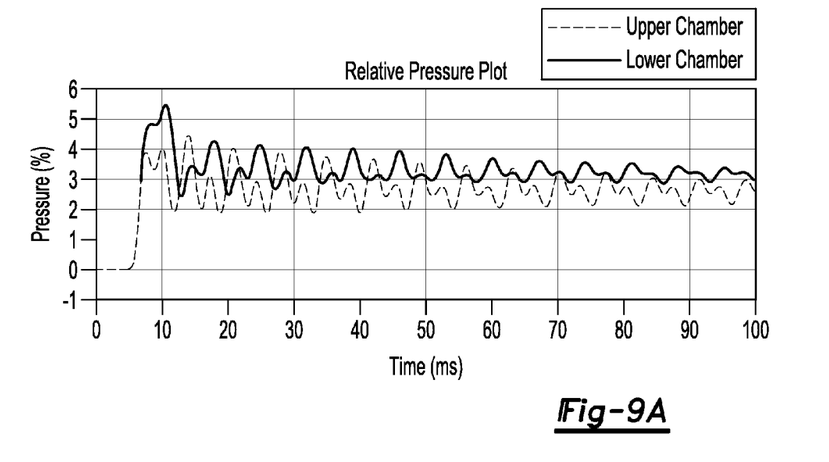
Figure 9B:
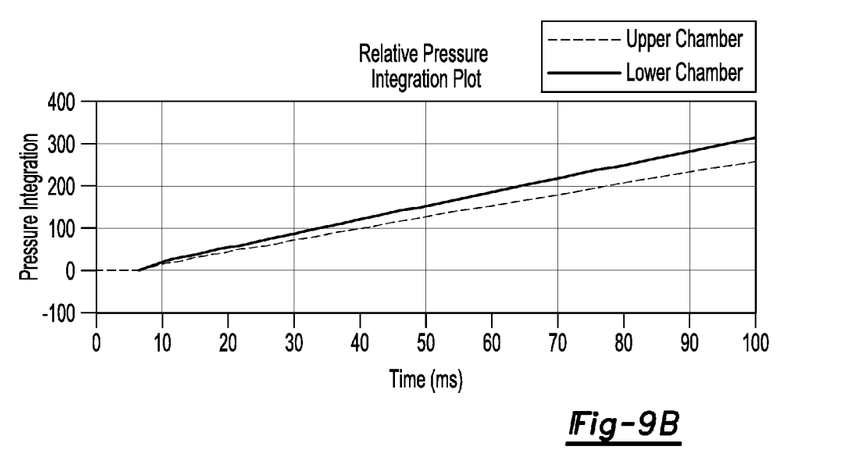
Figure 10A:
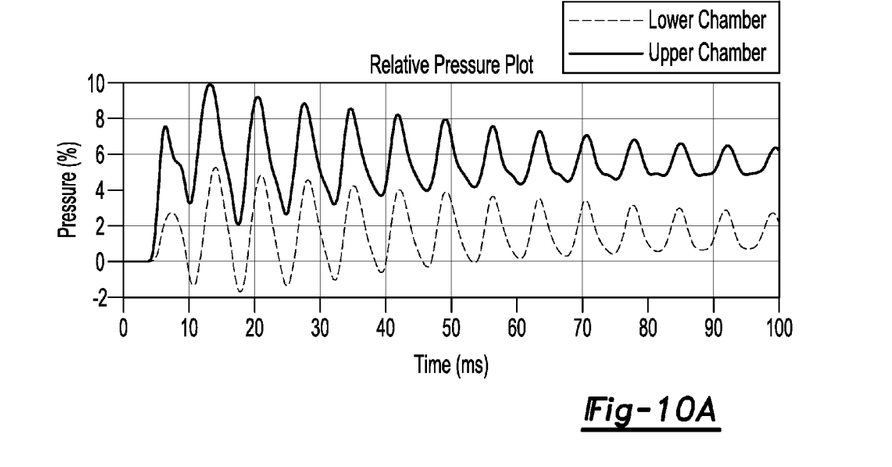
Figure 10B:
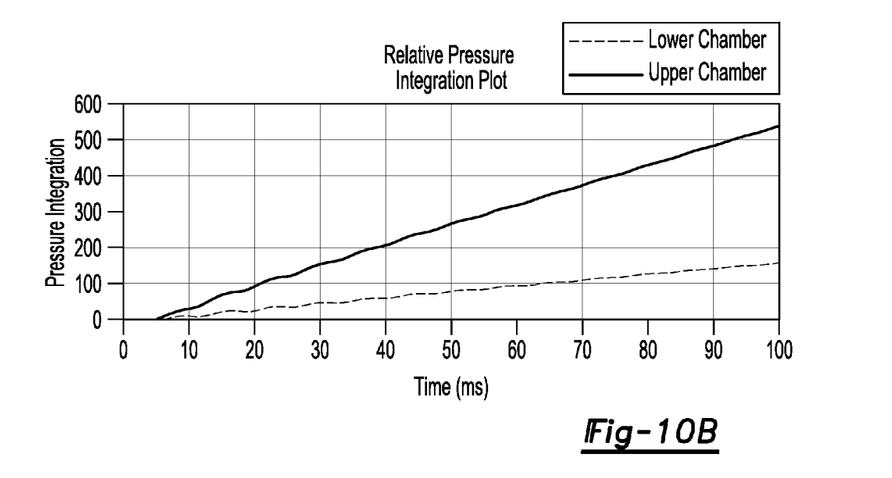

FIGS. 8A, 9A, and 10A show plots of the percent change in detected pressure versus time for Test 1, 2, and 3 respectively. FIGS. 8B, 9B, and 10B show plots of the integral of the detected pressure versus time for Test 1, 2, and 3 respectively. It is apparent from a comparison of the data from the three Tests that the pressure sensor signals may be used to detect the lateral location of an impact with the vehicle.

Figure 11:
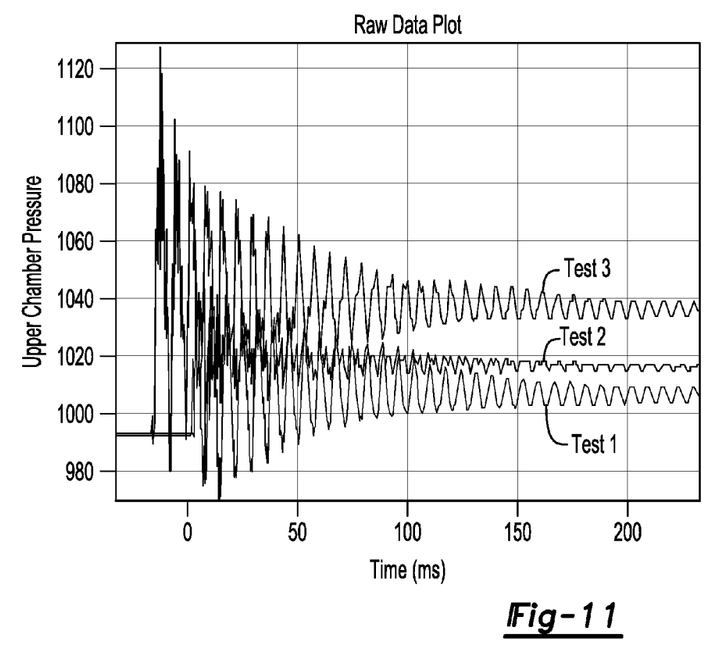
Figure 12:
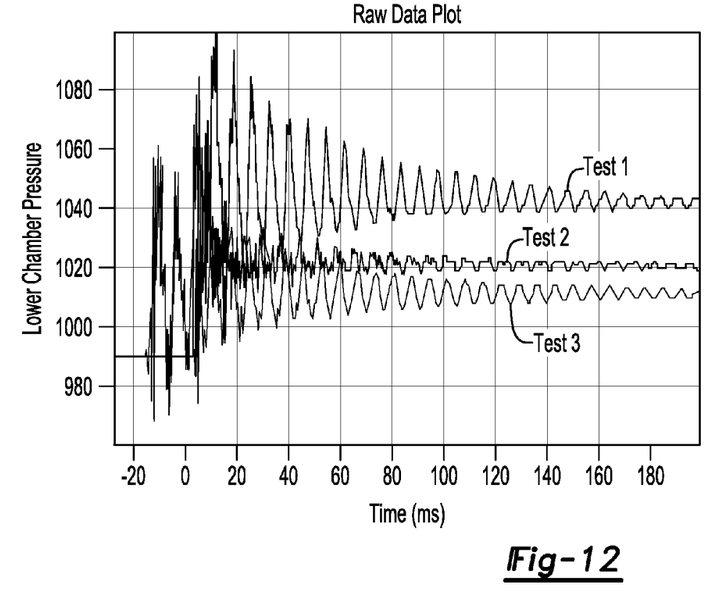

FIG. 11 shows the magnitude of the pressure signals recorded in upper chamber 20a for each of the three Tests. FIG. 12 shows the pressure signals recorded in lower chamber 20b for each of the three Tests. These magnitude data may also be used to determine important information regarding an impact, including the lateral location of an impact.

Figure 13:
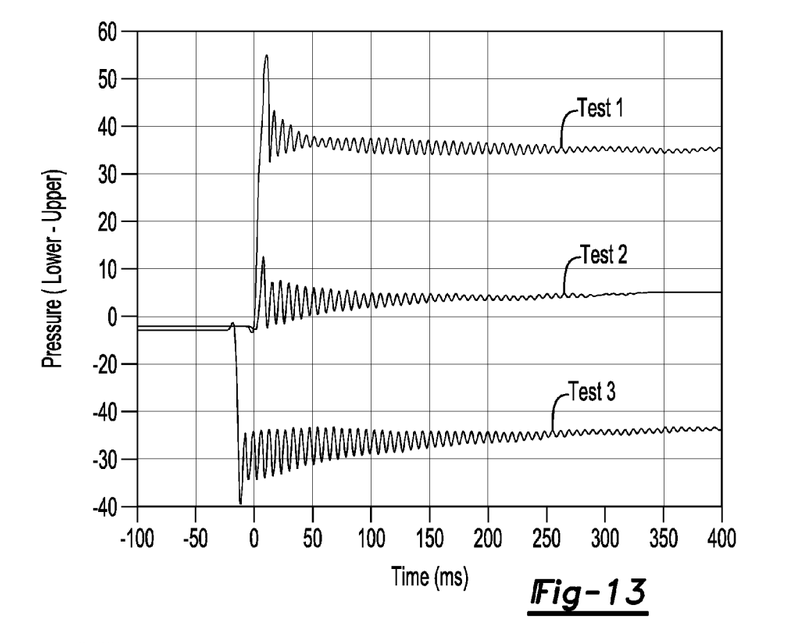
Figure 14:
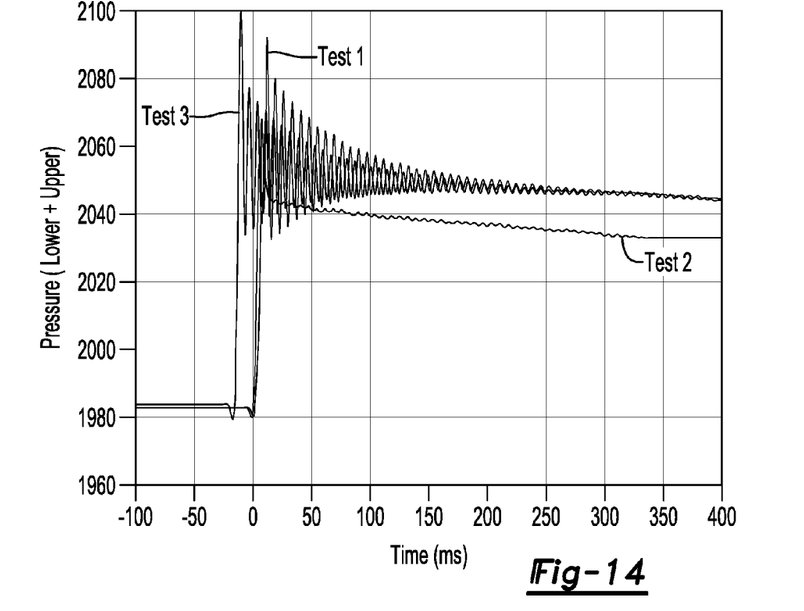

FIG. 13 shows the difference between the two pressure signals recorded (lower chamber pressure minus upper chamber pressure) for each of the three Tests. FIG. 14 shows the sum of the pressure signals recorded (lower chamber pressure plus upper chamber pressure) for each of the three Tests. These data may further aid in detecting the lateral location of an impact and/or the magnitude of the impact.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An impact detector comprising:
   a first chamber having a first cross-sectional area at a first end thereof and a second cross-sectional area at a second end thereof, the first cross-sectional area being greater than the second cross-sectional area;
   a second chamber adjacent to the first chamber such that first and second ends thereof coincide with the respective first and second ends of the first chamber, the second chamber having a first cross-sectional area at the first end thereof and a second cross-sectional area at the second end thereof, the second cross-sectional area being greater than the first cross-sectional area;
   a first sensor detecting a pressure internal to the first chamber; and
   a second sensor detecting a pressure internal to the second chamber.

2. The impact detector of claim 1 wherein the cross-sectional area of at least one of the chambers varies linearly between the first end and the second end thereof.

3. The impact detector of claim 1 wherein a ratio between the cross-sectional area of the first chamber and the second chamber varies from a maximum value at a first end of the impact detector to a minimum value at a second end of the impact detector.

4. The impact detector of claim 1 wherein the first and second chambers are approximately rectangular in cross-section.

5. The impact detector of claim 1 wherein the first and second chambers are disposed in an over/under arrangement.

6. The impact detector of claim 1 further comprising an ECU receiving signals from the first and second pressure sensors, comparing respective magnitudes and times-of-occurrence of pressure changes within the first and second chambers, and determining therefrom a location between the first and second ends of the impact.

7. The impact detector of claim 1 wherein the first sensor senses pressure adjacent to the first end of the first chamber and the second sensor senses pressure adjacent to the first end of the second chamber.

8. The impact detector of claim 1 adapted for mounting to a motor vehicle adjacent to a front structure of the motor vehicle.

9. Apparatus comprising:
   an impact detector adapted for mounting to a forward structure of a motor vehicle to extend approximately laterally relative to the vehicle, the detector having adjacent upper and lower chambers extending between opposite first and second ends of the detector, the upper chamber having a cross-sectional area varying between a minimum value at the first end and a maximum value at the second end, and the lower chamber having a cross-sectional area varying between a maximum value at the first end and a minimum value at the second end;
   a first sensor at either of the first end and the second end of the detector and detecting a pressure internal to the first chamber;
   a second sensor at either of the first end and the second end of the detector and detecting a pressure internal to the second chamber; and
   an ECU receiving signals from the first and second sensors and utilizing the signals to detect an impact on the detector.

10. The apparatus of claim 9 wherein a ratio between the cross-sectional areas of the upper and lower chambers varies from a maximum value at one of the first end and the second end of the detector to a minimum value at one of the opposite end of the detector.

11. The apparatus of claim 9 wherein the ECU is operative to compare respective magnitudes and times-of-occurrence of pressure changes within the first and second chambers, and determine therefrom a location of the impact relative to the first and second ends of the detector.

12. The apparatus of claim 9 further comprising a pedestrian protection system activated in response to detection of the impact.

13. The apparatus of claim 9 wherein when the detector is mounted to extend horizontally across the forward structure of the vehicle, the upper and lower chambers have respective vertical dimensions that vary inversely relative to one another between the first and second ends of the detector.

14. The apparatus of claim 9 wherein the cross-sectional area of at least one of the chambers varies linearly between the first end and the second end thereof.

15. The apparatus of claim 9 wherein the first and second chambers are approximately rectangular in cross-section.

16. The apparatus of claim 9 wherein the first sensor and the second sensor are at the same end of the detector.

17. The apparatus of claim 9 wherein the detector is adapted for mounting to a forward surface of a bumper beam.

18. A method comprising:
   monitoring a first pressure inside a first hollow member, the first member having a first cross-sectional area at a first end and tapering to a second cross-sectional area at a second end, the first cross-sectional area being greater than the second cross-sectional area;
   monitoring a second pressure inside a second hollow member, the second member adjacent to the first member such that first and second ends of the second member coincide with the respective first and second ends of the first member, the second member having a first cross-sectional area at the first end and tapering to a second cross-sectional area at the second end, the second cross-sectional area being greater than the first cross-sectional area; and
   comparing changes in the first pressure and the second pressure to determine at least one of a magnitude of an impact on the first and second members and a location of the impact between the first and second ends of the members.

19. The method of claim 18 further comprising:
   activating a safety system of a motor vehicle on which the hollow members are mounted based upon the location of the impact.

20. The method of claim 19 wherein the safety system is a pedestrian protection system.

21. The method of claim 20 wherein activating the pedestrian protection system comprises lifting a hood of the vehicle.

* * * * *